US012216035B2

(12) United States Patent
Fadil

(10) Patent No.: US 12,216,035 B2
(45) Date of Patent: Feb. 4, 2025

(54) METHOD OF PREPARING AN ORGANIC MATERIAL SAMPLE FOR LIBS ANALYSIS AND A SEARING DEVICE FOR USE IN THE SAME

(71) Applicant: Foss Analytical A/S, Hilleroed (DK)

(72) Inventor: Ahmed Fadil, Hilleroed (DK)

(73) Assignee: FOSS Analytical A/S, Hilleroed (DK)

( * ) Notice: Subject to any disclaimer, the term of this patent is extended or adjusted under 35 U.S.C. 154(b) by 0 days.

(21) Appl. No.: 18/004,565

(22) PCT Filed: May 11, 2021

(86) PCT No.: PCT/IB2021/053995
§ 371 (c)(1),
(2) Date: Jan. 6, 2023

(87) PCT Pub. No.: WO2022/013621
PCT Pub. Date: Jan. 20, 2022

(65) Prior Publication Data
US 2024/0272050 A1    Aug. 15, 2024

(30) Foreign Application Priority Data

Jul. 17, 2020 (DK) .............................. PA202000859

(51) Int. Cl.
*G01N 1/44* (2006.01)
*G01N 21/71* (2006.01)

(52) U.S. Cl.
CPC ............. *G01N 1/44* (2013.01); *G01N 21/718* (2013.01); *G01N 2223/612* (2013.01)

(58) Field of Classification Search
CPC .. G01N 1/44; G01N 21/718; G01N 2223/612; G01N 2021/4709; G01N 2201/129; G01N 2223/618; G01N 1/4044
See application file for complete search history.

(56) References Cited

U.S. PATENT DOCUMENTS 10,830,674 B2 * 11/2020 Nikolajsen ........... G01N 21/718
2017/0108441 A1 * 4/2017 Nault ....................... G01N 1/44
(Continued)

FOREIGN PATENT DOCUMENTS

WO    WO-02/060302 A2    8/2002
WO    WO-2018046981 A1    3/2018

OTHER PUBLICATIONS

International Search Report PCT/ISA/210 for International Application No. PCT/IB2021/053995 dated Jul. 19, 2021.
(Continued)

*Primary Examiner* — Tarifur R Chowdhury
*Assistant Examiner* — Kemaya Nguyen
(74) *Attorney, Agent, or Firm* — Harness, Dickey & Pierce, P.L.C.

(57) ABSTRACT

An organic material sample is prepared for LIBS analysis based on searing a sample of granular organic material having an organic matrix. The searing includes supplying heat to the sample for one or more known exposure times to produce a same number of searing instances, measuring reflectance values of the sample before and after one or more of the searing instances, determining a searing parameter as an indicator of a susceptibility of the organic matrix to searing determined based on the measured reflectance values, calculating a time value from an application of a predictive model derived from an empirical analysis of reference data comprising time values indexed against searing parameter to the searing parameter, the predictive model linking the searing parameter to the time value, generating a new exposure time using the time value, and heating the sample for the new exposure time to produce a new searing instance.

10 Claims, 5 Drawing Sheets

(56) References Cited

U.S. PATENT DOCUMENTS

2018/0284041 A1* 10/2018 Calvo ................ G01N 23/2273
2019/0170617 A1    6/2019 Nikolajsen et al.
2019/0387926 A1* 12/2019 Shei ........................ A47J 27/14

OTHER PUBLICATIONS

Written Opinion PCT/ISA/237 for International Application No. PCT/IB2021/053995 dated Jul. 19, 2021.
Danish Search Report dated Oct. 14, 2020.

* cited by examiner

METHOD OF PREPARING AN ORGANIC MATERIAL SAMPLE FOR LIBS ANALYSIS AND A SEARING DEVICE FOR USE IN THE SAME

CROSS-REFERENCE TO RELATED APPLICATIONS

This application is a National Stage of PCT/IB2021/053995, filed on May 11, 2021, which claims priority to Danish Patent Application PA202000856, filed on Jul. 17, 2020 in the Danish Patent and Trademark Office, the entire contents of each of which are incorporated herein in their entirety.

BACKGROUND

The present invention relates to a method of preparing an organic material sample for Laser Induced Breakdown Spectroscopy ('LIBS') analysis and to a searing device for use in the method.

LIBS is a spectrochemical technique that uses a pulsed laser of very short pulse duration (typically between nanoseconds and femtoseconds) which is focused on a sample to create transient temperatures upwards of 10,000 Kelvin.

In this environment, a portion of the sample is converted into plasma and the chemical bonds are broken to produce electronically excited atoms and ions. These excited species emit radiation at specific wavelengths (or characteristic emission lines) that depend on the constituent element.

By analysing the light emitted by the plasma it is possible to identify the constituent elements of interest by their characteristic emission lines and to measure the concentration of the constituent elements of interest by measuring the intensity of the light at their characteristic emission lines.

Ideally, the intensity of the characteristic emission line is dependent only on the quantity of the associated constituent element present in the sample. However, especially with samples of organic material such as plant based organic materials, it is generally known that variations in sample properties, being variations in physical or chemical properties of the matrix in which the constituent elements are found, affect the intensities of the characteristic emission lines of the associated constituent elements. This problem, generally referred to as "matrix effects", is well known in the art and is a factor that limits LIBS accuracy and repeatability.

Searing (also known as 'charring') of the organic sample surface is the chemical process of incomplete combustion of the organic material when subjected to a high heat and induces a thermochemical decomposition of the organic sample matrix, potentially removing oxygen and hydrogen from the matrix. It is known from US2019/0170617A1 that for a subsequent LIBS analysis of a surface of the sample, which is typically a pellet of compressed, granular, organic material, the thermochemical decomposition has two effects; 1) the emission lines for minerals are stronger since the elements are more easily ionized; 2) the accuracy for a quantitative elemental abundance analysis is improved since the seared matrices, when comparing similar organic materials, have more in common with respect to chemical composition than have the un-seared matrices.

According to US2019/0170617A1 the optimum searing duration for a particular organic matrix may be determined from observations of the effects of searing on a LIBS spectral signature of a characteristic constituent element which is present in the organic matrix of test samples. Whilst this searing has shown to provide some improvement in the LIBS analysis it has been found that the optimum searing duration can vary from sample to sample of the same organic matrix.

SUMMARY

It is therefore an aim of the present invention to provide a method of preparing an organic material for LIBS analysis and a searing unit adapted for use in the same in which the aforementioned limitation of the prior art is mitigated.

According to a first aspect of the present invention there is provided a method of preparing an organic material sample having an organic matrix, preferably a plant based organic material sample, for LIBS analysis.

Usefully, the organic material sample may be a press formed pellet of compressed organic material sample. Usefully with the pellet is retained in the die of the pellet press during searing which has an advantage that sample handling is reduced.

This method has an advantage that by monitoring the reflectance during searing for each sample pellet and applying a predictive model to the monitored reflectance an optimum searing duration may be determined which is specific to each sample pellet. The predictive model being empirically derived from an analysis of reference data comprising time values indexed against searing parameter established for a set of reference samples in which the optimum exposure time is established, for example visually or through measurement such as described in US2019/0170617A1, for each sample in the set of reference samples.

In some embodiments the predictive model is empirically derived by regression analysis. In some embodiments the regression analysis is a least-squares, in some embodiments a partial least squares, fit of the reference data and the predictive model is a polynomial, such as a first or a second degree polynomial, function of the searing parameter.

In some embodiments the predictive model is an exponential function of the searing parameter.

In some embodiments the regression model is empirically derived from an analysis of the reference data by employing spline fitting or applying an Artificial Neural Network.

According to a second aspect of the present invention there is provided a searing device for searing an exposed surface of a sample pellet consisting of a compressed granular organic material having an organic material matrix.

The searing device, having a heater for searing that is controlled in dependence of the reflectance values for the sample being seared, as measured by a reflectance unit of the device, permits each sample to be seared for an optimum searing time and thus is configured to provide the advantages of the method according to the first aspect of the present invention.

According to a third aspect of the present invention there is provided a method of performing laser induced breakdown spectroscopy (LIBS) on an organic material sample.

The sample for LIBS is prepared according to the method of the first aspect of the present invention and so the method according to the third aspect has the advantages associated with that first aspect.

BRIEF DESCRIPTION OF THE DRAWINGS

These and further advantages of the present invention will be described in further detail with reference to the exemplary embodiments that are described below with reference to the drawings of the accompanying figures, of which.

DETAILED DESCRIPTION

Figure 1:
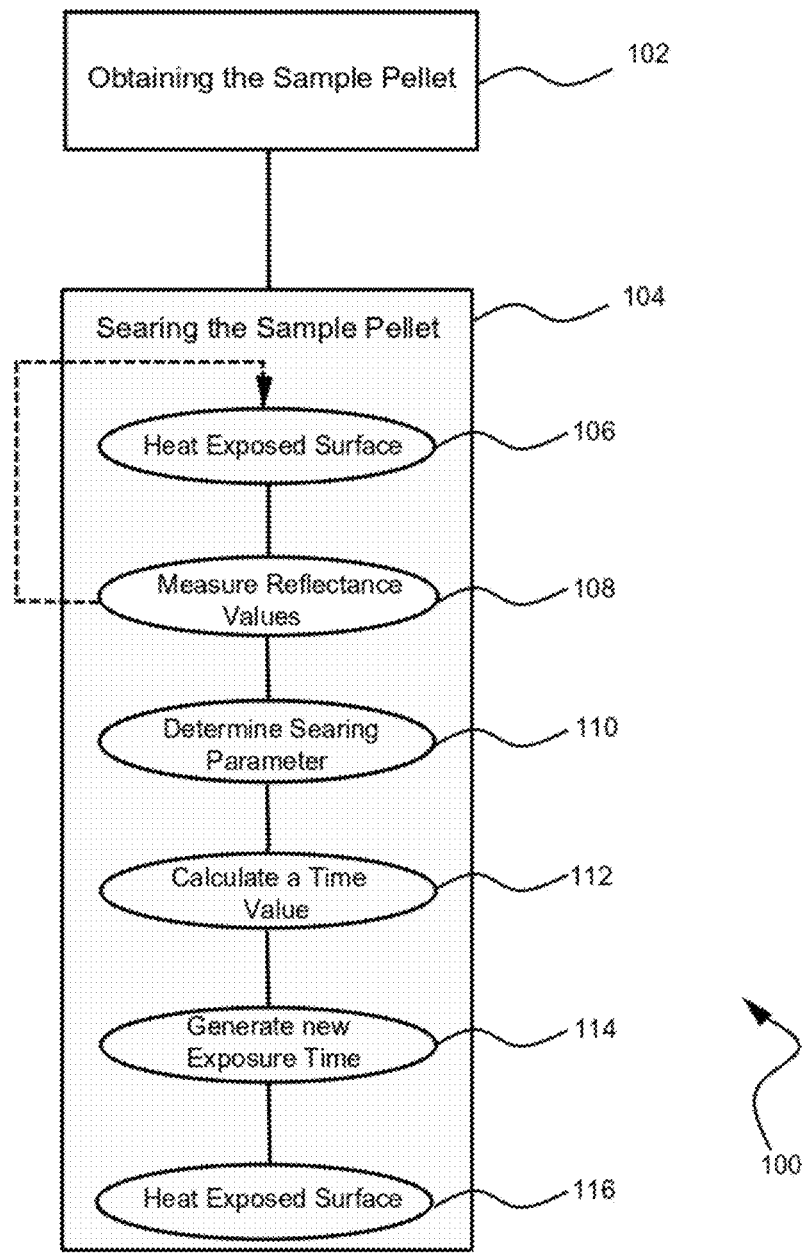
FIG. 1 shows a flow diagram illustrating an embodiment of the method according to the first aspect of the present invention.

Considering FIG. 1, a flow diagram exemplifying a method 100 of preparing an organic material sample for laser induced breakdown spectroscopy (LIBS) according to the present invention is illustrated as comprising: a step 102 of obtaining a sample pellet of compressed granular organic material having an organic matrix in which is disposed elements of interest for LIBS investigation; and a step 104 of searing the sample pellet at an exposed surface to produce a searing event, which comprises a number of individual searing instances, during each of which searing instance the organic matrix at the exposed surface undergoes a thermochemical decomposition.

Searing the sample pellet at step 104 comprises a step 106 of controlling a heater unit to supply heat to the exposed surface for one or more known exposure times to produce a same number of searing instances; a step 108 of measuring reflectance values of the exposed surface before and after one or more of the one or more searing instances using a reflectance unit; a step 110 of determining by a data processor a searing parameter as an indicator of a susceptibility of the organic matrix to searing determined based on the measured reflectance values; a step 112 of calculating by the data processor a time value indicative of a time to achieve an optimum exposure time from the application by the data processor of a predictive model to the determined searing parameter, the predictive model linking the searing parameter to time value; step 114 of generating a new exposure time using the calculated time value; and a step 116 of heating the exposed surface for the new exposure time $T_{N+1}$ to complete the searing event. This may be performed in a single new searing instance or may be performed in a plurality of searing instances, where all of the plurality of searing instances together extend for the new exposure time $T_{N+1}$.

By way of example only, according to a first embodiment the step 106 of supplying heat and the step 108 of measuring the reflectance values is repeated once. With each repetition the exposure time, $T_N$, where N is the number of searing instances, is here held constant but in other embodiments the exposure time $T_N$ may differ between the repetitions.

In this embodiment the searing parameter, X, is determined at the step 110 according to the equation:

$$X = B_N e^{-2A_{N-1}} \qquad (1)$$

where $A_N$ is relative difference between the reflectance values RN measured at the step 108 and $B_N$ is its cumulative sum. These are determined according to the equation:

$$A_N = \frac{R_N - R_{N-1}}{R_{N-1}}, B_N = \Sigma_{n=1}^{N} A_n \qquad (2)$$

$R_0$ is the value of reflectance of the exposed surface measured before any searing instance, $S_n$. The searing parameter, X, uses the evolution of the reflectance level to estimate how susceptible a sample is to the searing process. The reflectance level evolution is captured by the cumulative sum parameter, $B_N$. The higher the value of searing parameter X, for a given sample, the more difficult it is to sear that sample.

In this embodiment the predictive model which is employed at the step 112 to calculate the time value, $T_{corr}$ indicative of a time necessary to achieve an optimum exposure time is an exponential model of the form:

$$T_{corr} = ae^{bX} + c \qquad (3)$$

and is determined empirically, as is described in greater detail below.

The new exposure time, $T_{N+1}$, that is generated at step 114 is then expressed as:

$$T_{N+1} = T_N + T_{corr} \qquad (4)$$

In this embodiment the time value $T_{corr}$ is a correction to be added to the previous exposure time $T_N$. In other embodiments, the time value $T_{corr}$ may be a time value representing completely a new exposure time needed to achieve an optimum searing (that is, $T_{N+1} = T_{corr}$).

According to a second exemplary embodiment, the step 106 of supplying heat and the step 108 of measuring the reflectance values is repeated once (that is, two searing instances, $S_1$ and $S_2$). With each repetition the exposure time, $T_N$, where N is the number of searing instances, is again held constant but in other embodiments the exposure time $T_N$ may differ between the repetitions.

In this embodiment the searing parameter, X, is determined at the step 110 according to the equation:

$$X = \frac{R_N}{R_0} \qquad (5)$$

where $R_0$ is again the value of reflectance of the exposed surface measured before any searing instance and here RN is the value of reflectance (that is, $R_2$) of the exposed surface measured after the second searing instance, $S_2$.

In this embodiment the predictive model which is employed at the step 112 to calculate the time value, $T_{corr}$ indicative of a time necessary to achieve an optimum exposure time is a second order polynomial model of the form:

$$T_{corr} = aX^2 + bX + c \qquad (6)$$

and is determined empirically, as described in greater detail below

The predictive models used at step 112 depend on the form of searing parameter, X, chosen. The predictive model is determined empirically from observations on a reference sample set of pellets of compressed granular organic material having different organic plant matrices. The sample set which is employed to illustrate how the prediction model may be determined is set out in Table 1 below:

TABLE 1

| Matrix | $T_{Corr}$ (ms) | Optimum Searing Time (ms) |
| --- | --- | --- |
| Hay | 400 | 1300 |
| Soy | 900 | 1800 |
| Plant | 1000 | 1900 |
| Grass and Whole crop silage | 600 | 1500 |
| Barley and Peas silage | 200 | 1100 |
| Grass and Clover | 100 | 1000 |
| Grass Silage | 100 | 1000 |
| Grass Bushel | 150 | 1050 |
| Grass + Clover Silage | 300 | 1200 |
| Alfalfa silage | 750 | 1650 |
| Barley (whole crop silage) | 600 | 1500 |
| Hay | 250 | 1150 |
| Legume Hay | 900 | 1800 |
| Small Grain Hay | 600 | 1500 |
| Straw Hay | 300 | 1200 |

The reference time value $T_{corr}$ i.e. the time required for each sample pellet of the reference sample set to achieve an optimum searing, is estimated based on the following protocol:

Each sample is exposed to 3 searing instances, $S_1$, $S_2$ and $S_3$

The 1st and 2nd searing instances, $S_1$ and $S_2$ have a duration, $T_1$ and $T_2$ respectively, of 300 ms The 3rd searing instance $S_3$ duration, $T_3$, is adjusted as: $T_3 = 300\ ms + T_{corr}$, that is, according to equation (4).

Each reference sample has at least 3 replicas which are exposed to different searing times by modifying the $T_{corr}$ value.

The optimum searing is determined by visually inspecting the 3 or more replicas of a reference sample and the reference time value $T_{corr}$ is determined as the time required to achieve optimum searing. The optimum searing is that searing for which the complete sample surface just turns black leaving no un-seared spots. The reference time value $T_{corr}$ thus obtained for each reference sample is stored in a memory for subsequent access by a data processor. In other embodiments the optimum searing may be determined by monitoring the effects of searing on a LIBS spectral signature of a characteristic constituent element which is present in the organic matrix of test samples in a known manner, as described for example in US2019/0170617A1.

For each pellet that is seared, the reflectance value ($R_N$) is measured before any searing instance, $R_0$, after the first searing instance, $R_1$ and after the second searing instance, $R_2$. The measured values $R_0$, $R_1$, and $R_2$ are stored in the memory for subsequent access by the data processor.

Figure 2:
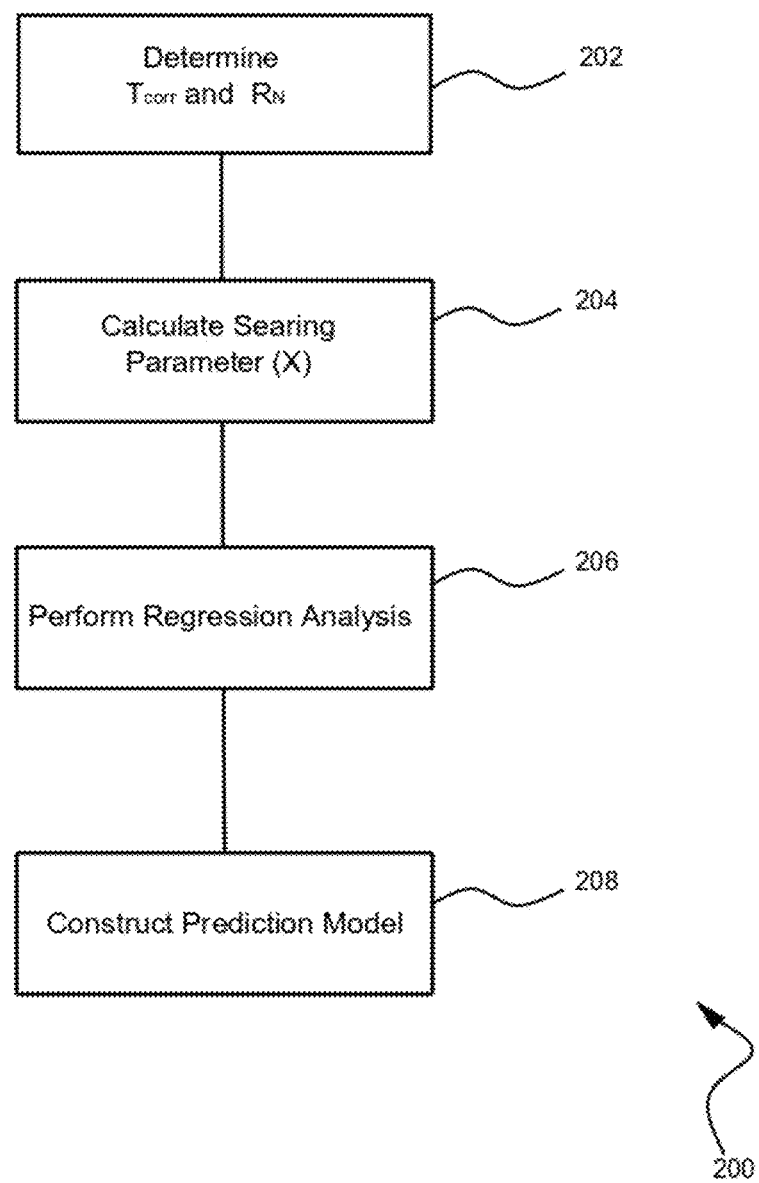
FIG. 2 shows a flow diagram illustrating an embodiment of a method for empirically determining the prediction model employed in the method according to the first aspect of the present invention.

FIG. 2 illustrates a flow diagram exemplifying a method 200 for determining the prediction model for use in step 112 to calculate a time value $T_{corr}$.

At a step 202 reference time values $T_{corr}$ are determined and reflectance values ($R_N$) before ($R_0$) during ($R_1$) and after ($R_2$) one or more (for example two) searing events are measured for a set of sample pellets of a reference sample set (such as set out in Table 1) and stored in a memory for access by a data processor. This may be achieved according to the protocol described above.

At a step 204 searing parameters (X) are calculated in the data processor for each sample of the reference sample set using the reflectance values stored in memory at step 202.

At a step 206 regression analysis is performed in the data processor to model the relationship between the dependent variable of reference time values ($T_{corr}$) determined at step 202 and the corresponding independent variable (X) calculated at step 204.

At a step 208 a prediction model is constructed from the analysis performed at step 206 for use in the method according to the first aspect of the present invention.

Figure 3:
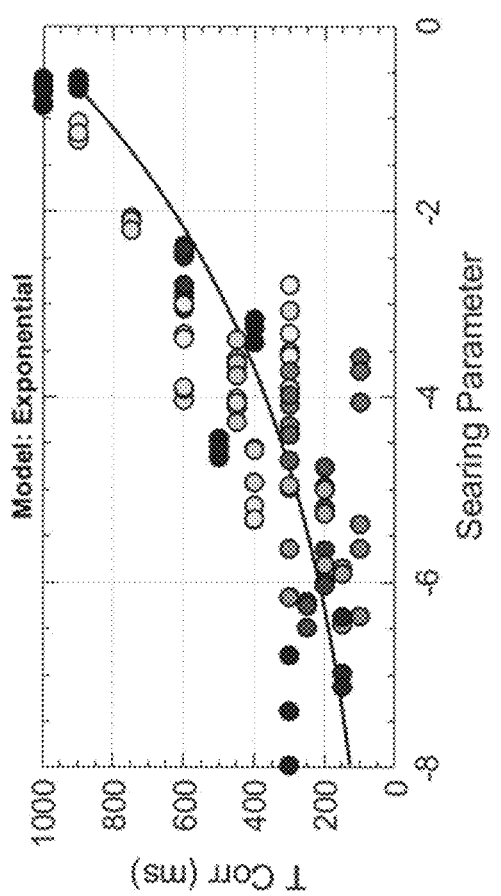
FIG. 3 shows the correlation between the searing parameter and the reference searing time values for a set of measurements of given samples, where the predictive model is an exponential function of the searing parameter.

In embodiments using the searing factor X of the form set out in equation (1) a model of the form set out in equation (3) may be established with the variables $a=1076$; $b=0.2677$ and $c=0$, established using a least squares fit. This relationship is illustrated in FIG. 3 where the variation of $T_{corr}$ with X is mapped graphically together with the 'best-fit' line calculated using equation (3) and the values of a, b and c stated above to minimize the sum of the squared residuals.

Figure 4:
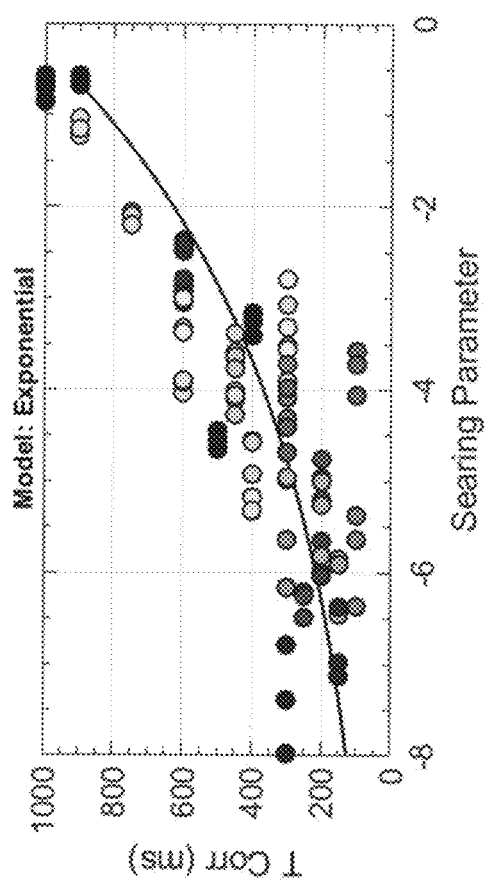
FIG. 4 shows the correlation between the searing parameter and the reference searing time values for a set of measurements of given samples, where the predictive model is a second order polynomial function of the searing parameter.

In embodiments using the searing factor X of the form set out in equation (5) a model of the form set out in equation (6) may be established with the variables $a=-1238$; $b=2494$ and $c=0$, established using a least-squares fit. This relationship is illustrated in FIG. 4 where the variation of $T_{corr}$ with X is mapped graphically together with the 'best-fit' line calculated using equation (6) and the values of a, b and c stated above to minimize the sum of the squared residuals.

However the searing parameter X and the time value $T_{corr}$ are calculated, it will be appreciated that the same method of calculation must be applied at step 110 and 112 (in this example, three searing instances, the first two of which are for the same known duration of 300 ms and the third having a duration which is adjusted dependent on the value $T_{corr}$) and the new exposure time must be generated at step 114 accordingly (that is, for example according to equation (4) or for example using the calculated value of $T_{corr}$ directly as the new exposure time generated at step 114).

Figure 5:
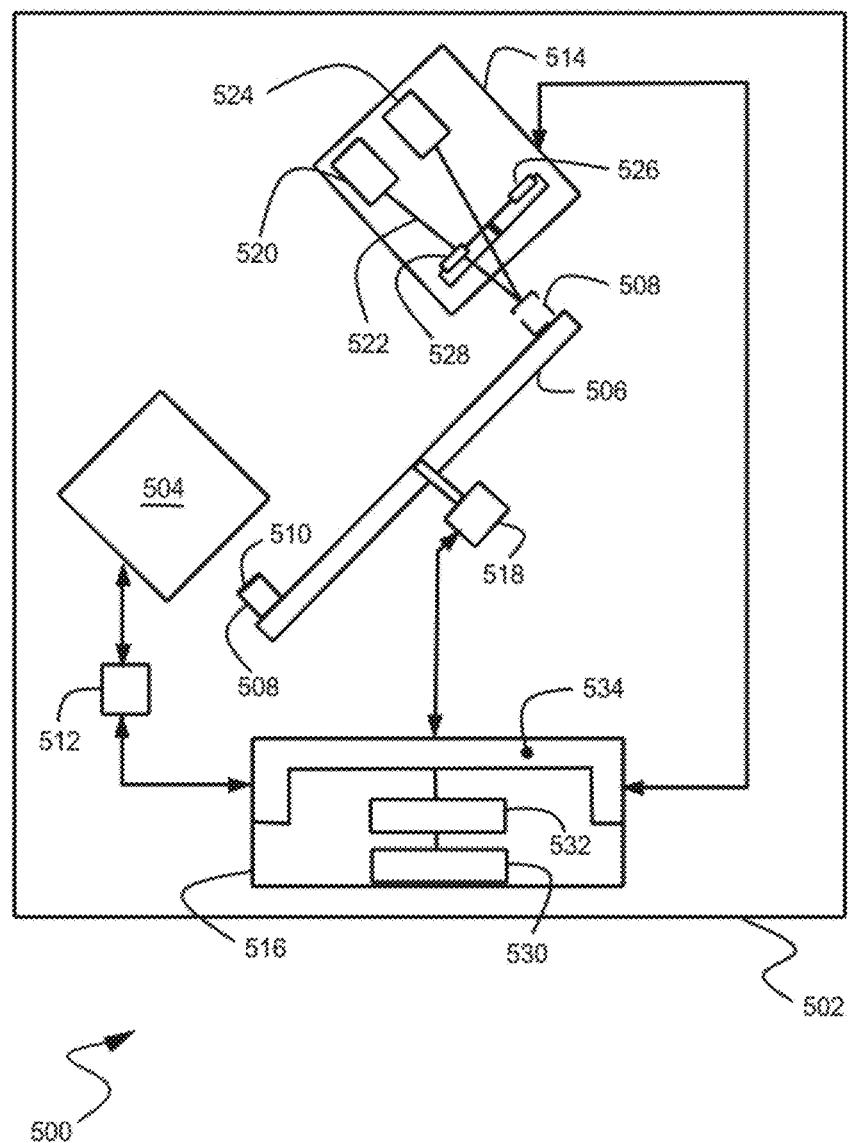
FIG. 5 illustrates schematically a searing device according to the present invention.

An example of a searing device 500 is illustrated schematically in FIG. 5. The searing device 500 comprises a housing 502 which houses some or all of the remaining components of the searing device 500. The searing device 500 further comprises a heating unit 504; a holder 506 for holding a sample pellet 508, for example retained in an open ended die in which the sample pellet 508 was pressed, with an exposed surface 510 accessible to heat from the heating unit 504; a controller 512 adapted to control the operation of the heating unit 504 to supply heat to the exposed surface 510 for an exposure time to generate a searing instance $S_n$; a reflectance unit 514 adapted to supply optical radiation to and detect the supplied optical radiation reflected from the exposed surface 510 for use in measuring reflectance values of the exposed surface 510; and a data processor 516 adapted to provide control signals to the controller 512, the data processor 516 being configured to implement program coding dedicated to processing the measured reflectance values to determine a searing parameter therefrom as an indicator of a susceptibility of the organic matrix to searing; to calculate a time value indicative of an optimum exposure time by applying the determined searing parameter to a predictive model which links searing parameter to time value; and to generate a control signal representing new exposure time obtained using the calculated time value for use by the controller 512 in controlling the operation of the heating unit 504 to supply heat to the exposed surface 510 for a period equal to the new exposure time.

In some embodiments, the heating unit 504 comprises a gas burner and a gas supply, for example bottled propane gas, which may be sited internal or external of the housing 502. In other embodiments different sources of heat, such as infra-red or resistive heating, may substitute for the gas burner of the present heating unit 504.

In some embodiments and as illustrated in FIG. 5, the holder 506 comprises a rotatable disc adapted to receive and hold one or more sample pellets (in the present embodiment a single sample pellet 508) and rotatable by means of a connected motor unit 518 to move the received sample pellet 508 selectively between a first position (solid line construction) in which the exposed surface 510 of the sample pellet 508 is accessible to heat from the heating unit 504 and a second position (broken line construction) in which reflectance measurements can be performed by the reflectance unit 514.

The reflectance unit 514 is of a known construction and may comprise a light source 520 which is adapted to emit light along a light path 522 towards the exposed surface 510 of a sample pellet 508 when in the second position (broken line construction) and a complementary detector 524 configured to detect light emitted by the light source 520 after being reflected, for example diffusely reflected, from the exposed surface 510 of a sample pellet 508 when in the second position (broken line construction). In some embodiments one or more reflectance standards (illustrated two reflectance standards 526, 528) are provided, either internal or external of the reflectance unit 514, and are each moveable into and out of the light path 522 to intercept light emitted by the light source and to reflect a known percentage of the intercepted light for detection by the detector 524 for use in calibrating the reflectance unit 514.

The data processor 516 generally includes a memory module 530, a programmable computing module 532 and an input/output (I/O) module 534. The memory module 530 holds program code which when implemented by the computing module 532 causes the data processor 516 to, amongst other things, process reflectance values measured by the reflectance unit 514 to determine a searing parameter therefrom as an indicator of a susceptibility of the organic matrix to searing; to calculate a time value indicative of an optimum exposure time by applying the determined searing parameter to a predictive model which links searing parameter to time value; and to generate a control signal representing new exposure time obtained using the calculated time value and transmitting it via the I/O module 534 to the controller 512 for use in controlling the operation of the heating unit 504. In the present embodiment the memory module 530 also holds accessible suitable program code which when implemented by the computing module 532 causes the data processor 516 to control the operation of one or more of the other elements of the searing device 500, such as the reflectance unit 514, the motor unit 518 and the movement of the reflectance standard(s) 526, 528, in order to implement the method according to the first aspect of the present invention.

Examples of the data processor 516 include but are not limited to one or more of a laptop computer; a desktop computer, a remotely connected server. The memory module 530 may include but is not limited to one or more of a disk drive, an EPROM, a CD-ROM.

Upon completing the preparation of the organic material sample according to the method 100 of the first aspect of the present invention, as exemplified with reference to the description of FIG. 1 above, preferably utilizing the searing device 500 according to the second aspect of the present invention, as exemplified with reference to the description of FIG. 5 above, then laser induced breakdown spectroscopy (LIBS) may be performed on the so prepared sample pellet by subjecting the seared granular organic material sample, here the exposed surface 510 of the prepared sample pellet 508, to a laser beam pulse so as to produce a plasma ablation event and then performing a spectrometric analysis of light generated in the plasma ablation event in a manner well known in the art of LIBS.

The invention claimed is:

1. A method of preparing an organic material sample for laser induced breakdown spectroscopy, the method comprising:
   a. obtaining a sample of granular organic material, the granular organic material having an organic matrix; and
   b. searing the sample of granular organic material to produce a searing event during which the organic matrix undergoes a thermochemical decomposition, wherein the searing the sample of granular organic material includes
      (i) supplying heat to the sample of granular organic material for one or more known exposure times ($T_N$) to produce a same number (N) of one or more searing instances ($S_n$) of the sample of granular organic material;
      (ii) measuring reflectance values ($R_N$) of the sample of granular organic material before and after producing one or more of the one or more searing instances ($S_n$) of the sample of granular organic material;
      (iii) determining, by a data processor, a searing parameter (X) as an indicator of a susceptibility of the organic matrix to searing determined based on the measured reflectance values ($R_N$);
   (iv) calculating, by the data processor, a time value ($T_{corr}$) indicative of a time to achieve an optimum exposure time from an application, by the data processor, of a predictive model derived from an empirical analysis of reference data comprising time values indexed against searing parameter to the searing parameter (X), the predictive model linking the searing parameter (X) to the time value ($T_{corr}$);
   (v) generating, a new exposure time ($T_{N+1}$) using the time value ($T_{corr}$); and
   (vi) heating the sample of granular organic material for the new exposure time ($T_{N+1}$) to produce a new searing instance of the sample of granular organic material.

2. The method according to claim 1, wherein:
   a. obtaining the sample of organic material comprises compressing the granular organic material to form a sample pellet; and
   b. searing the sample of granular organic material comprises searing the sample pellet at an exposed outer surface.

3. The method according to claim 1, wherein
   a. the predictive model is a polynomial function of the searing parameter (X), and
   b. coefficients of the polynomial function of the searing parameter (X) are determined by a least-squares analysis of reference time values ($T_{corr}$) indexed against the searing parameter (X) for a set of reference samples.

4. The method according to claim 3, wherein the searing parameter (X) is calculated as a ratio of a measured reflectance value ($R_0$) before producing a first searing instance ($S_1$) of the sample of granular organic material and a measured reflectance value ($R_N$) after producing all of the one or more searing instances ($S_N$) of the sample of granular organic material.

5. The method according to claim 1 wherein the predictive model is an exponential function of the searing parameter (X).

6. The method according to claim 5, wherein the searing parameter (X) is calculated as a function of a relative difference ($A_N$) of the measured reflectance values ($R_N$) between successive searing events ($S_n$) and of a cumulative sum ($B_N$) of the measured reflectance values ($R_N$).

7. The method according to claim 1 wherein the granular organic material is a plant material.

8. A method of performing laser induced breakdown spectroscopy on an organic material sample, the method comprising:
   a. preparing the organic material sample according to the method as claimed in claim 1;
   b. subjecting the organic material sample to a laser beam pulse to produce a plasma ablation event; and
   c. performing a spectrometric analysis of light generated in the plasma ablation event.

9. The method according to claim 8 wherein
   a. the preparing the organic material sample includes preparing the organic material sample to form a sample pellet having an exposed outer surface, and
   b. the subjecting the organic material sample to the laser beam pulse includes subjecting the exposed outer surface to the laser beam pulse to produce the plasma ablation event.

10. A searing device for searing an exposed surface of a sample pellet of a compressed granular organic material having an organic material matrix, the searing device comprising:

a heating unit;
a holder configured to hold the sample pellet with the exposed surface accessible to heat from the heating unit;
a controller configured to control operation of the heating unit to supply heat to the exposed surface for an exposure time ($T_N$) to produce a searing instance of the sample pellet;
a reflectance unit configured to supply optical radiation to the exposed surface and to detect the supplied optical radiation reflected from the exposed surface to measure reflectance values ($R_N$) of the exposed surface before and after producing the searing instance of the sample pellet; and
a data processor configured to
   provide control signals to the controller to control the operation of the heating unit,
   implement program coding to process the measured reflectance values ($R_N$) to determine a searing parameter (X) therefrom as an indicator of a susceptibility of the organic material matrix to searing,
   calculate a time value ($T_{corr}$) by applying the searing parameter (X) to an empirically derived predictive model which links the searing parameter (X) to the time value ($T_{corr}$), and
   generate a control signal representing a new exposure time ($T_N$) obtained using the time value ($T_{corr}$) for use by the controller to control the operation of the heating unit to supply heat to the exposed surface for a period equal to the new exposure time ($T_N$).

* * * * *